Patented Dec. 24, 1946

2,413,077

UNITED STATES PATENT OFFICE 2,413,077 d(+)-ALPHA, GAMMA - DIHYDROXY - BETA, BETA - DIMETHYL - BUTYRIC - ACID - (HYDROXY-ALKYL)-AMIDES AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application May 8, 1943, Serial No. 486,270. In Switzerland May 8, 1942

6 Claims. (Cl. 260—561)

Pantothenic acid and homologs thereof have been manufactured by reacting d(—)-α-hydroxy-β,β-dimethyl-γ-butyric-acid-lactone with β-alanine, salts or esters thereof, or with other corresponding amino carboxylic acids (see, for instance, Science, vol. 91, year 1940, p. 411; Journal of the American Chemical Society, vol. 62, year 1940, p. 1785; U. S. Letters Patent No. 2,234,680; Helvetica Chimica Acta, vol. 23, year 1940, p. 651; Journal of the American Chemical Society, vol. 62, year 1940, p. 1628).

It has now been found that new derivatives of d(—)-α,γ-dihydroxy-β,β-dimethyl-butyric acid can be obtained by allowing alcanolamines to react thereon. Preferably, the reaction is effected in a solvent.

The new compounds exert the biological activities of pantothenic acid. They are to be used as medicinal preparations.

*Example 1*

130 parts by weight of d(—)-α-hydroxy-β,β-dimethyl-γ-butyric-acid-lactone are dissolved in 150 parts by volume of methyl alcohol. 75 parts by weight of 3-hydroxy-propylamine are added, in one portion, to the solution and the mixture is well stirred. While the reaction sets in, the temperature of the mixture gradually rises by itself to about 50° C. and then drops again after about two hours. To cause completion of the reaction, the mixture is allowed to stand at room temperature for 24 hours. The so obtained (d+)-α,γ-dihydroxy-β,β-dimethyl - butyric - acid-(3'-hydroxy-propyl)-amide is freed from methyl alcohol in vacuo. It is a colorless, viscous oil, easily soluble in water. It boils under a pressure of 0.02 mm. between 118 and 120° C. Its optical activity $\alpha_D^{20}$ amounts to +29.7° for C=3% in water.

*Example 2*

130 parts by weight of (d—)-α-hydroxy-β,β-dimethyl-γ-butyric-acid-lactone and 89 parts by weight of 1-hydroxy-3-aminobutane are dissolved in 200 parts by volume of methyl alcohol. The reaction sets in under spontaneous heating of the mixture. After 24 hours, the methyl alcohol is distilled off. The distillation is completed by heating to 100° C. under a pressure of 0.02 mm. The d(+)-α,γ-dihydroxy- β,β -dimethyl-butyric-acid-(1'-methyl-3'-hydroxy-propyl)-amide is a viscous, colorless oil, easily soluble in water. Its optical activity $\alpha_D^{20}$ amounts to +16.14 for C=5.32% in water.

I claim:

1. d(+)-α,γ-Dihydroxy-β,β-dimethyl - butyric-acid-(hydroxy-alkyl)-amides.

2. d(+)-α,γ-Dihydroxy- β,β -dimethyl-butyric-acid-(3'-hydroxy-propyl)-amide.

3. d(+)-α,γ-Dihydroxy-β,β -dimethyl-butyric-acid-(1'-methyl-3'-hydroxy-propyl)-amide.

4. Process for the manufacture of d(+)-α,γ-dihydroxy-β,β-dimethyl - butyric-acid-(hydroxy-alkyl)-amides, comprising reacting d(—)-hydroxy-β,β-dimethyl-γ-butyric-acid-lactone with an alcanolamine in a solvent.

5. Process for the manufacture of d(+)-α,γ-dihydroxy-β,β-dimethyl - butyric-acid-(3'-hydroxy-propyl)-amide, comprising reacting d(—)-hydroxy-β,β-dimethyl-γ-butyric-acid-lactone with 3-hydroxy-propyl-amine in a solvent.

6. Process for the manufacture of d(+)-α,γ-dihydroxy-β,β-dimethyl - butyric-acid-(1'-methyl-3'-hydroxy-propyl)-amide, comprising reacting d(—)-hydroxy-β,β-dimethyl-γ-butyric-acid-lactone with 1-methyl-3-hydroxy-propyl-amide in a solvent.

OTTO SCHNIDER.